(12) United States Patent
Davidson et al.

(10) Patent No.: US 8,060,470 B2
(45) Date of Patent: Nov. 15, 2011

(54) HETEROGENEOUS DATABASE MANAGEMENT SYSTEM

(75) Inventors: Mark Davidson, Scotts Valley, CA (US);
Erwin Hom, Foster City, CA (US);
Robert Parks, Castro Valley, CA (US)

(73) Assignee: Apple Inc., Cupertino, CA (US)

( * ) Notice: Subject to any disclaimer, the term of this patent is extended or adjusted under 35 U.S.C. 154(b) by 489 days.

(21) Appl. No.: 12/342,684

(22) Filed: Dec. 23, 2008

(65) Prior Publication Data
US 2010/0161574 A1    Jun. 24, 2010

(51) Int. Cl.
*G06F 17/30* (2006.01)
(52) U.S. Cl. ............... 707/634; 707/648; 707/809
(58) Field of Classification Search ............ 707/634, 707/636, 648, 809, 999.201
See application file for complete search history.

(56) References Cited

U.S. PATENT DOCUMENTS

| | | | |
|---|---|---|---|
| 5,903,895 A * | 5/1999 | Hoffman et al. | 708/112 |
| 7,031,981 B1 * | 4/2006 | DeLuca et al. | 1/1 |
| 2002/0156552 A1 * | 10/2002 | Whiting | 700/300 |

* cited by examiner

*Primary Examiner* — Cheryl Lewis
(74) *Attorney, Agent, or Firm* — Fish & Richardson P.C.

(57) ABSTRACT

An administration server in a database management system retrieves log files in a plurality of formats from a plurality of clients through helper programs running on the clients. The plurality of clients can include Web servers, application servers, and database servers. The log files can be generated by software modules on the clients. An administration engine converts log entries in the log files into a unified format for display. The converted log entries can be stored in a log database. Upon a user request, the administration server presents the log entries to the user in a log viewer. The log viewer can display log entries originated from heterogeneous software modules in a unified view.

18 Claims, 9 Drawing Sheets

HETEROGENEOUS DATABASE MANAGEMENT SYSTEM

TECHNICAL FIELD

This subject matter relates to database management systems.

BACKGROUND

In a distributed computing environment, heterogeneous components of a database management system can be hosted on multiple servers. A database management application can have multiple software modules, such as Web servers, application servers, databases, and load balancers. The software modules can be hosted on a variety of computers running on a variety of operating systems. Each of the computers can have a unique system configuration. Each software module can also have an individualized or unique logging mechanism. For example, a system log can contain memory usage, disk usage, Input/Output (I/O) frequency, paging frequency, etc. A Web server log can contain access time, access Internet Protocol (IP) address, and page visited. An application log can contain tracing information. A database log can contain number of active connections, number of commits, number of reads, etc.

A system administrator is often required to monitor the status of software modules on a variety of servers. For example, in a complex Web-based, database-backed application, a system administrator needs to monitor the health of each database on each server, and load-balance the system by directing a next request to a proper database. For another example, if a Web-based, database-backed application fails to respond to a user request, a system administrator needs to locate a component in the system that failed. The failure can be a software failure or a hardware failure. The system administrator can identify a failed component by viewing logs for each software module and each computer.

Traditionally, system and database log files are vendor proprietary. A database vendor can provide homogeneous log files for the vendor's database, even when the database runs on a variety of operating systems. Similarly, a computer vendor can provide a homogeneous log files for the computer vendor's computers, no matter what database runs on the computers. Furthermore, technologies exist to view both a server log file and system log files in a single viewer. However, no existing solutions provide a unified viewer for interactive display of disparate log files.

SUMMARY

An administration server in a database management system retrieves log files in a plurality of formats from a plurality of clients through helper programs running on the clients. The plurality of clients can include Web servers, application servers, and database servers. The log files can be generated by software modules on the clients. An administration engine converts log entries in the log files into a unified format for display. The converted log entries can be stored in a log database. Upon a user request, the administration server presents the log entries to the user in a log viewer. The log viewer can display log entries originated from heterogeneous software modules in a unified view.

In one implementation, a heterogeneous database management system can be an administrative tool for analyzing database application performance. In one example, a server program can periodically read log files created by disparate software and hardware components in the database management system. The log files can be generated by, for example, a Web publishing core, a database, an application program, or a computer system. The service process can normalize log entries in the log files into a unified format. The unified format can include date, event description, severity, and source. The unified format can differ from the log file formats generated by the disparate software and hardware components.

In another implementation, a heterogeneous database management system can include a client application. A client application can provide information to a system administrator. The client application can request information from a service program. The information can be stored in a storage device in a unified format. The client application can display the information in a table view combined with graphical form. The combined tabular and graphical form can provide a graphical user interface that enables a user to select an entry in a log viewer table, and as a result of the selection, view a corresponding graph, and vice versa.

In yet another implementation, a client application in a heterogeneous database management system can display database usage characteristics. The database usage characteristics can include the number of connections, memory usage, and number of reads and writes. The database usage characteristics can be correlated to a system event log, based on date and time. The client application and the service program can provide normalization of event information based on database usage statistics and system event log. Normalized event information can be provided to a user in an integrated viewer to assist the user to identify performance issues.

In another implementation, a client application can display the database usage characteristics in a graphical manner. Further, a client application can provide a graphical user interface for managing a database. The graphical user interface can allow a user to start a database, stop a database, change configurations for a database, and back up the database.

The details of one or more implementations of a heterogeneous database management system are set forth in the accompanying drawings and the description below. Other features, objects, and advantages of the techniques will be apparent from the description and drawings, and from the claims.

DESCRIPTION OF DRAWINGS

Like reference symbols in the various drawings indicate like elements.

DETAILED DESCRIPTION

System Overview

Figure 1:
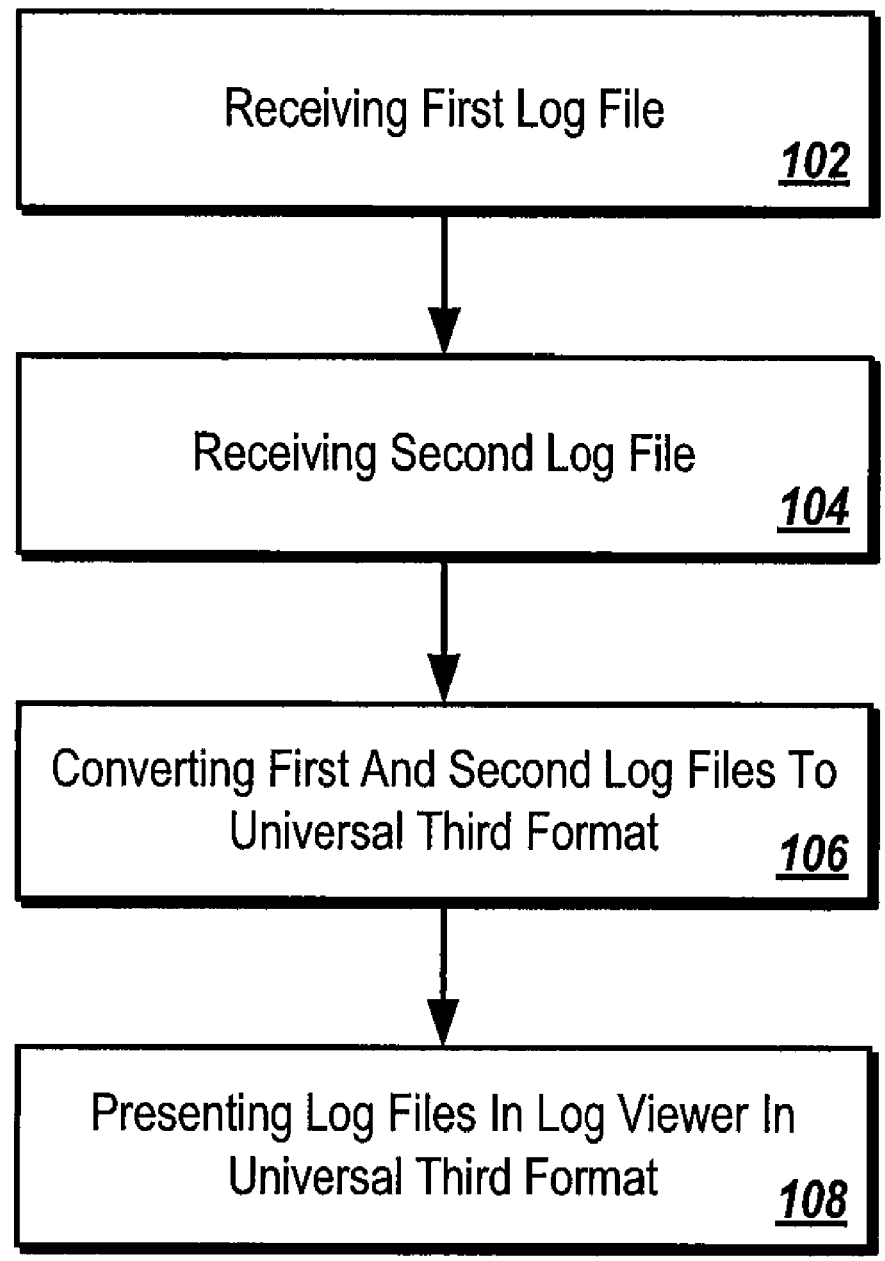
FIG. 1 is a flowchart illustrating an example process for processing heterogeneous log files.

FIG. 1 is a flowchart illustrating an example process 100 for processing heterogeneous log files. In a step 102, a server in the heterogeneous database management system receives or reads a first log file from a client. The terms "server" and "client" are made in reference to a distributed computing architecture, where "client" computers and "server" computers communicate over a computer network. One or more computer programs on a "client" computer can make service requests to one or computer programs on a "server" which listens to the clients. Computer programs running on "server" computers provide the requested service in return. A client-server relationship can be relative. For example, a Web server can be a server coupled to many client computers which run Web browser programs. The same Web server can be a client in a heterogeneous database management system, where the Web server makes "update log" requests to a server that manages various log files.

In step 102, a server program receives or reads the first log file from a software module of the database management system. A log file in step 102 can be a file automatically created and maintained by a computer program on a client. A log file can record the activities of a software module on the client. An example log file can be a Web server access file, where the Web server is a client in a heterogeneous database management system. A log file can be in a format that is recognized by a helper for the server. For example, a log file can be a Web server access log file or error log file in the W3C Extended Log File Format. A log file can alternatively be a database transaction log file. Log files are commonly stored on a storage device in a directory.

The receiving or reading of a log file in step 102 can be achieved by a plurality of implementations. In one example implementation, a server in a heterogeneous database management system can periodically poll the client computers. Polling can include accessing particular directories on client computers where log files are stored. The period of access can be configured as a cron job in a UNIX™ based system. The access can be achieved by creating dedicated password-less remote access user accounts with limited privileges. A configuration profile can limit the privileges to log access only.

In another example implementation, a server can periodically poll the client computers by running software that implements instances of a monitor class. A monitor instance can communicate with an instance of a helper class. A helper instance can run on a client computer. A helper instance can execute a method to record a recent entry in a log file on a client, and communicate the recent entry back to the monitor.

In another example implementation, the receiving of first log file in step 102 can be achieved by creating one or more daemon programs on a client machine that monitor log files on the client machine. A daemon program can be a computer program that runs in the background on a UNIX™ based system. Daemon programs can be configured to monitor database logs, Web server logs, system logs, or any other log file that is created by an application program. Once a daemon program on a client detects an update, the daemon program can remotely invoke a process on a server. The invocation can be, for example, through a remote procedure call (RPC), or more specifically, through a remote method invocation, in an object-oriented programming environment. As an alternative to remotely invoking a process on a server, a daemon program on a client computer can use Web services to send the updates to a server. Information can be passed by an HTTP request such as POST or GET. The HTTP request can originate from a client. A server can host a Web server that contains a component to process information passed in from a client. A server can identify a client by an IP address that is included in a header of the HTTP request.

In a next step 104, a server in the heterogeneous database management system receives a second log file from a client. The second log file can be associated with a second software module. The format of the second log file can differ from the log file received in step 102. The method of receiving a second log file can also differ from the method of receiving a first log file in step 102. The method of receiving the first and second log files can be dictated by the nature of the first and second log files. For example, a customized application program on a client computer can be configured to write application program logs to a directory on a remote server computer.

The format of the second log file in step 104 can differ from the format of the first log file in step 102. For example, the first log file can be a Web server access log, while the second log file can be a database transaction log. The logs can be in ASCII format or in binary format. The logs can contain Extensible Markup Language (XML). The logs can also be compressed.

In a next step 106, a server in the heterogeneous database management system converts log entries in the first and second log files received or read in step 102 and step 104 into a third, unified log file format. The unified third log file format can differ from the formats of first and second log files received by the server. In one example implementation, the unified log file format can contain the following log fields: date, module, type, event ID, and event description. A "date" field can contain date and time of a logged event. A "module" field can contain information on the source of an event. The information can include, for example, which software module created the event, on which client computer, etc. A "type" field can contain an event type, e.g., whether the event is informational, a warning, or an error. An "event ID" field can contain unique identifiers of events. A "description" field can contain a free-form text string describing the event. Each log entry can be in the same format. Table 1 is an example implementation of a LogEntry class.

TABLE 1

Class Definition for a Unified Log File Format

```
/**
 * Set of logging modules which are available to a log viewer
 */
public enum Module {
    FMS-ACCESS,
    FMS_EVENT,
    PE-APPLICATION,
    PE-ACCESS,
    WEB-LOG,
    WPC_ACCESS
}
/**
 * The types of logging information. This maps to the Type column
 */
public enum Type {
    INFORMATION,
    WARNING,
    ERROR;
}
/**
 * The types of events which can be seen in the log viewer.
 * This maps to the ID column in the log viewer. i.e., 406, ...
 */
public enum EventID {
}
/**
 * A class which represents a log event.
 * This represents a row of data in the log viewer table.
 */
public class LogEntry {
    private Date date;        // date and time of the log event
    private Module module;    // the module of the event
```

TABLE 1-continued

Class Definition for a Unified Log File Format

```
    private Type type;
    private EventID id;
    private String description;
/**
 * Constructs a LogEntry of data.
 */
    public void LogEntry(Module module, Date date, Type type,
                        EventID id, String description) {
        this.module = module;
    }
}
```

In another implementation of a unified format in step 106, log entries from various software modules on client computers can contain both a universal component and a module specific component. A universal component can contain date, module, type, event ID, and description fields, as described above. A module specific component can contain information that is specific to the module from which a logged event originated. For example, for an application program log, an event can be that an error occurred when a particular user accessed a particular process. While module specific information can be put in a description field as text, it can be beneficial to separate fields such as user ID, process ID, etc., for viewing or data mining purposes. Therefore, subclasses can be created for the LogEntry class as shown in Table 1.

In step 106, a server in the heterogeneous database management system can also write a first or second log file in a unified log file format to a storage device. In one example implementation, the writing can be achieved by a serialization method for the LogEntry class or its subclasses. In a second example implementation, a log writer can write the entries of logs in the unified log format to log files in text format. A benefit of the second example implementation can be simplified automatic rotation of log files. Automatic rotation process can be set up to delete or archive log files that are older than a certain time period, e.g., one week or one month. In a third example implementation, the first or second log file in the third, unified log file format can be stored in a main database table. The main database table can have fields corresponding to common data fields in the log file. Module specific data can be tracked in separate tables, whose table names and keys can be tracked as sub-table names and foreign keys in the main database table.

In a next step 108, a server in the heterogeneous database management system presents the converted log files in a log viewer in unified log file format on a display device. The first and second log files can be presented in a table having rows and columns. The rows of the table can correspond to log entry times. A column of the table can indicate which software module generated an original entry. Another column of the table can indicate a severity condition associated with the software module. A severity condition can be whether the event is informational, is a warning, or is an error.

In step 108, the rows of the table, which corresponds to number of displayable log file entries, can be limited. In one example implementation, the rows of the table can be limited by a time period. The time period can be defined by a start time and end time. A time period can also be defined to contain periods and intervals. For example, a time period can be "every Monday from 9 a.m. to 12 noon." In a second example implementation, the rows of the table can be limited by an event number. For example, the server can display the last N long entries in a log database. In a third example implementation, the rows of the table can further be limited by the software module that generated the event. For example, a user can view all log entries generated from a database, an application, or a Web server. Table 2 shows example implementations of listing log entries.

TABLE 2

Listing Log Entries

```
/**
 * Returns a collection of LogEntries for the module(s)
 * between <code>toDate</code>
 * and <code>fromDate</code>. If <code>toDate</code> is NULL,
 * assume the current date/time.
 *
 * @param modules
 * @param fromDate
 * @param toDate
 * @return a non-null list of log entries
 */
public List<LogEntry> getEntries(EnumSet<Module> modules,
                                 Date fromDate, Date toDate) {
}
/**
 * Returns a collection of LogEntries for the module
 * <code>module</code> between <code>toDate</code>
 * and <code>fromDate</code>. If <code>toDate</code> is NULL,
 * assume the current date/time.
 *
 * @param module
 * @param fromDate
 * @param toDate
 * @return a non-null list of log entries
 */
public List<LogEntry> getEntries(Module module, Date fromDate,
                                 Date toDate) {
}
/**
 * Returns the collection of LogEntries for the module
 * <code>module</code> between <code>start</code>
 * and <code>end</code>. If the module contains N log entries,
 * the 1st entry is its most recent entry.
 * The Nth entry is the first entry in the log file. This method returns
 * (end – start) entries.
 *
 * @param module
 * @param start
 * @param end
 * @return a non-null list of log entries
 */
Public List<LogEntry> getEntries(Module module, long start, long end) {
}
/**
 * Returns the number of entries in <code>module</code>
 * between <code>fromDate</code> and
 * <code>toDate</code>. This method is used to determine the number of
 * entries in a log file between the requested dates, so a getEntries( )
 * request can be broken up into smaller 'chunks' for performance reasons.
 */
public long getNumEntries(Module module, Date fromDate,
                          Date toDate) {
}
```

In Table 2, the getEntries( ) method can be invoked by a log viewer, a client program, or through an application programming interface (API) to retrieve log entries in a unified format. Retrieving log entries can be limited based on module selection, date range, severity type, or other limiting criteria.

Example Architecture

Figure 2:
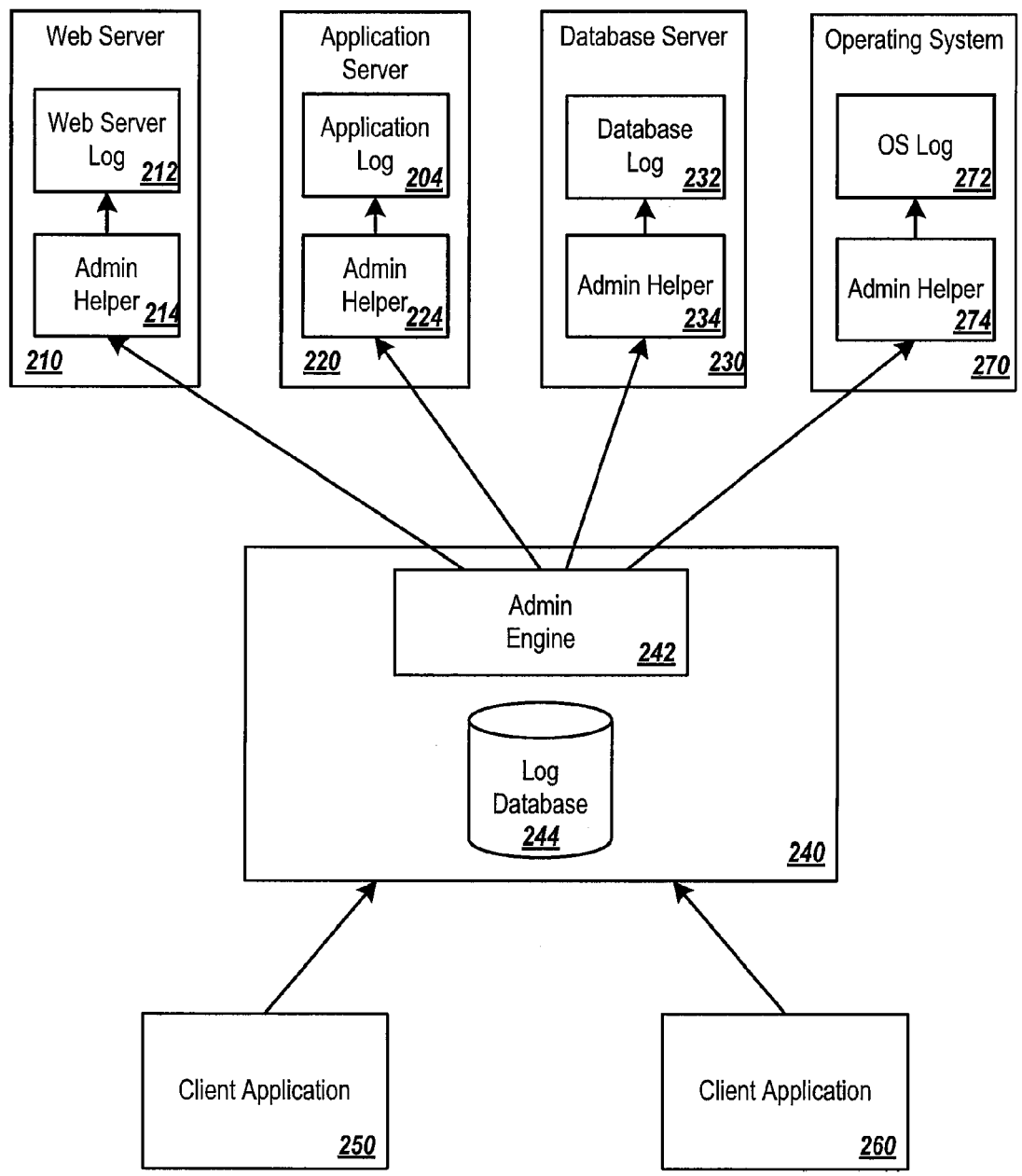
FIG. 2 shows an example architecture of a client-server based heterogeneous database management system.

FIG. 2 shows an example architecture of a client-server based heterogeneous database management system. In one example implementation, three heterogeneous servers 210, 220, and 230 are presented. Servers 210, 220, and 230 can be software modules in a typical database-backed Web application. Server 210 is a Web server. A Web server can be a commercially available Web server, an out-of-the-box Open Source Web server, or a customized Web server such as a Web publishing core. Server 220 is an application server that provides Web based service through Web server 210. Server 230 is a database server. An application running on application server 220 can use a database hosted on the database server 230 as a backend. An example of an application on application server 220 can be a publishing engine. Servers 210, 220, and 230 can be hosted on a single computer, or on a plurality of computers.

Furthermore, a "software module" is not limited to a database, Web, or application program. A software module can be an operating system on a computer. In one example implementation, an admin helper 274 can run on an operating system 270. Operating system 270 can run on any computer in a system, including a computer that runs software modules 210, 220, and 230. Operating system 270 can create an operating system log file 272. Admin helper 274 can contain a helper adaptor to convert operating system log file 272 to standard log entries for a unified log viewer.

Web server 210 can generate and maintain Web server logs 212. Web sever logs 212 can include access logs and error logs. An admin helper program 214 can run as part of Web server 210 or in conjunction with Web server 210. In one example implementation, admin helper program 214 can be a daemon running in the background. In another example implementation, Admin helper program 214 can be a routine built into the Web server itself. A routine built into the Web server can be a dynamic shared object (DSO), which can be a module in an Apache™ HTTP Server. Admin helper program 214 can monitor log files 212 generated by a Web server. When Admin helper program 214 detects an update of log files 212, Admin helper program 214 can send an update request to an Admin Server 240. The request can be in the form of an RPC call or an HTTP request.

In another example implementation, admin helper program 214 can be invoked by Admin Server 240. Admin Server 240 can make a request to admin helper program 214 on server computer 210. Admin helper program 214 can send a requested log file, or a portion of a requested log file, to the Admin Server 240 using an HTTP URL Connection. An HTTP URL Connection can be implemented with a universal HTTP connection class. For example, An HTTP URL Connection can be implemented with a java.net.HttpUrlConnection class published by SUN™ Inc.

Similarly, application server 220 can contain application logs 222. An admin helper program 224 monitors the application logs 222. Admin helper program 224 can run similarly as admin helper program 214. Admin helper program 224 can alternatively run in a different manner from admin helper program 214. Database server 230 can contain database logs 232. An admin helper program 234, tailored for database server 230, can run on database server 230.

Admin Server 240 manages log files or log file entries from software modules 210, 220, and 230. Information passed from admin helpers 214, 224, and 234 can contain log files or log file entries in native formats. After receiving the log files or log file entries in native formats, Admin Server 240 can store the log files or log file entries in a local cache folder (e.g., Logs/cache) on the Admin Server 240. The log files or log file entries can be a mirror image of remote log files. A benefit for keeping mirror copies of the remote log files is reduced access latency when a user views the log files, because the cached mirror image can be parsed like local log files. Cached files can be created at Admin Server 240 startup time, and updated periodically by an admin engine 242. Admin engine 242 can be an independent program or a thread of a program running on the Admin Server 240. In one example implementation, admin engine 242 can manage the admin helpers 214, 224, and 234 by periodically requesting updates from admin helpers 214, 224, and 234. An update from admin helpers 214, 224, and 234 can contain entire log files or new log entries. New log entries can be appended to cached log files. A cache will be cleared out and rebuilt when the Admin Server 240 is restarted. In another example implementation, admin engine can request updating from admin helpers 214, 224, and 234 when a user views log entries in a log viewer through a client application 250 or 260. Client applications 250 and 260 can be log viewers.

An Admin Server 240 can cache a List<LogEntry> collection of objects for log file entries cached in a local Log/cache directory. Admin engine 242 can be configured to create the List<LogEntry> collection when Admin Server 240 receives a request from a user to build a List. Once a List<LogEntry> has been created, Admin Server 240 can cache that List until a new request is made on a software module that provided log entries in the List. When a new request is made, the existing List can be discarded and a new List can be constructed. For example, if a user requests Event.log entries from last week, the Admin Server 240 can construct the List object and return it to the a server administration console, or a log viewer 250 or 260. If another request is made for Event.log entries from a more recent time period that does not overlap with an existing time period, e.g., today, the List of entries from the prior week will be discarded.

Admin Server 240 can avoid re-reading any entries whenever possible. In the previous example, if a user requests Event.log entries from the previous seven days, then requests Event.log entries for yesterday, no re-reading of Event.log is necessary. If the user requests Event.log entries from the previous 14 days, the Admin Server 240 can avoid re-reading the seven days already in its cache, and just read the seven days not in its cache.

In one example implementation, Admin Server 240 can keep all cached log entry lists in a centralized log database 244. Log database 244 can contain "normalized" log entries instead of raw log entries. Normalized log entries are log entries that conform to a unified log file format. Caching normalized entries in a log database 244 has the potential advantage of providing quicker user response upon user request. However, Caching normalized entries in a log database 244 can have potential disadvantage of wasted computing resources when a user does not view the content of the logs.

A user can request viewing of the log entries for various software modules. The viewing can be through client applications 250 and 260. Client applications 250 and 260 can be log viewers. Admin Server 240 can provide various views of the log files. For example, client application 250 can be a dedicated client program communicating directly to Admin Server 240. Client application 260 can be a Web browser, which communicates with Admin Server 240 through a Web based interface.

The example implementation in FIG. 2 shows servers 210, 220, 230, client applications 250 and 260, and Admin Server 240 as distinct components. It should be noted that servers 210, 220, 230, client applications 250 and 260, and Admin Server 240 can be computer programs or software modules that can be hosted by one or more computers. When a server program and client programs run on a same computer, the network connection between the server and clients can be through a loop back.

Example Log Viewer Display

Figure 3A:
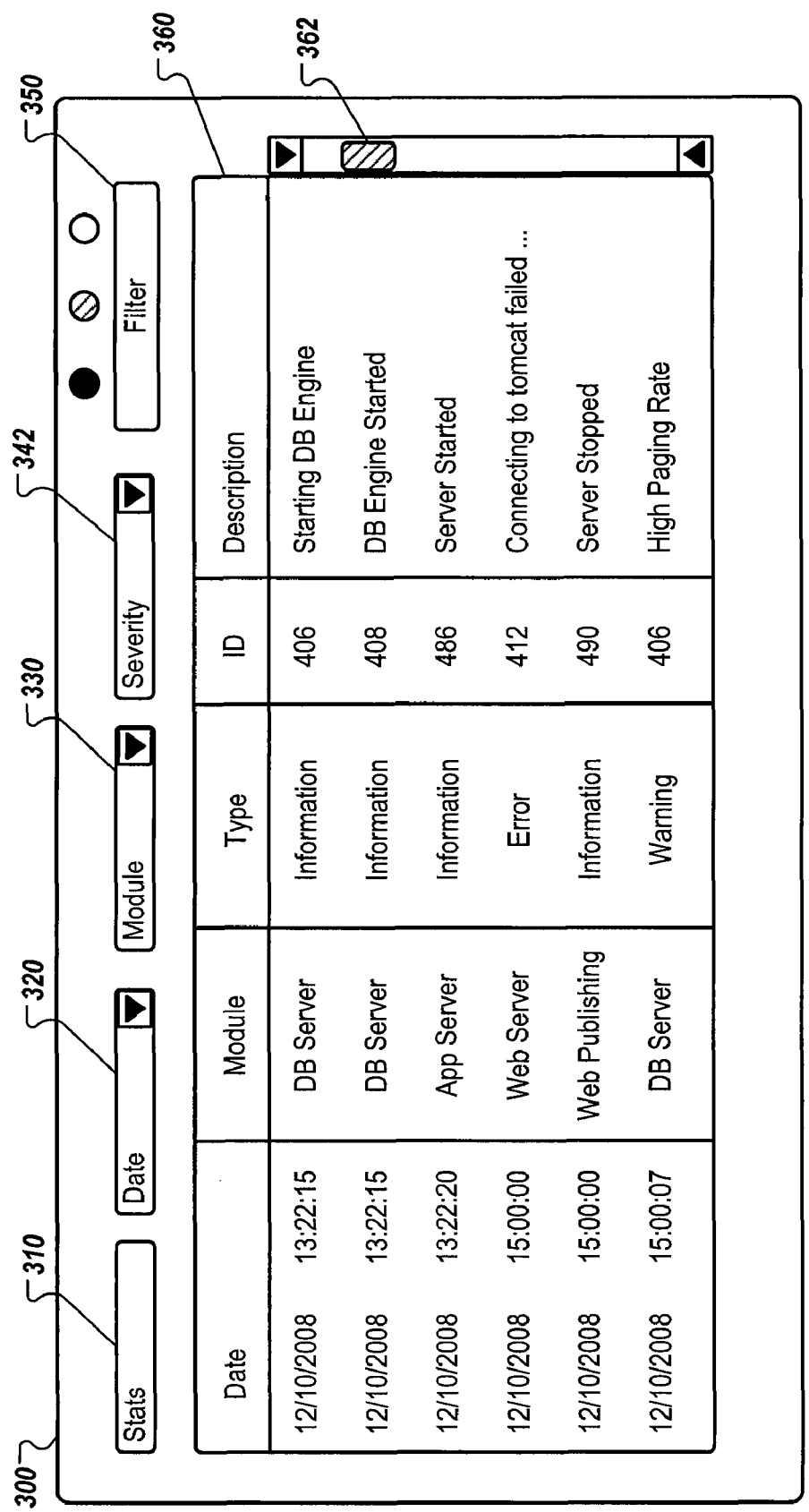
FIGS. 3A-3C are example displays of a unified log viewer.

FIG. 3A is an example display of a unified log viewer 300. Log viewer 300 is a display of a tabular view of normalized log files from various software modules. Log viewer 300 can contain a graphical control interface. A graphical control interface can include buttons, pull-down menus, pop-up windows, and text input areas. A toggle control button 310 can toggle between a table view 360, a statistical view (see FIGS. 3B and 3C), or a combined table and statistical view (see FIG. 4).

A range control box 320 can be used to determine which entries in a log file to display. For example, range control box 320 can specify "Date" as a factor to limit the log entries displayed. When "Date" is specified, Admin Server 240 can display additional user interface components such as text boxes, pull-down menus, or pop-up dialog boxes in order to allow a user to specify a date range. An example date range can be specified as a day, a week, a month, etc. A date range can also be specified to include hour, minute, or second. A date range can also be a recurring period, e.g., every Monday. For another example, range control box 320 can specify "Number" as a factor to limit the log entries displayed. When "Number" is specified, Admin Server 240 can display additional user interface components such as text boxes, pull-down menus, or pop-up dialog boxes to allow a user to specify a number range. An example number range can be "the last 100 log entries" or "the last 200 to last 100 log entries." Control box 320 can also specify other limiting factors.

A module selection control 330 can control the source of log entries displayed in table view 360. A user can select one or more software modules whose logs are to be displayed. Some examples of software module selection are: server access, server events, application engine access, application engine events, Web server access, and Web publishing core access. Further, module selection control 330 can allow a user to view all logs for all Web servers in a system; view logs of a particular Web server in a system based on server name or IP address; view a particular type of log of all Web servers, such as access logs or error logs; and view a particular type of log of a particular Web server. In addition to controlling the viewing of Web servers, the module selection control 330 can be used to select event logs, application logs, or other logs. Admin Server 240 can display a user dialog box when a user selects to limit the display by both software module type and log type (e.g., error logs for all application servers), or when a user selects a subset of software modules (e.g., some, but not all, database servers).

Severity controls 342 can control which type of log file entries can be displayed in table view 360. A log file entry can be classified by a severity. Displayed data can be limited by severity level. For example, severity control 342 can limit the table view 360 to show all log entries, to show log entries that are "warnings," or log entries that are "errors." Severity levels can be determined by the nature of the event that caused an entry to be registered in a log file. Because the system is heterogeneous, log entries from different software modules can have different meanings for a log entry type "information," "warning," or "error." The admin engine 242 can maintain a mapping, that maps events from database logs, Web logs, and application server logs to each log entry type.

A column field filter control 350 can be used to limit displayed data. For example, column field filter control 350, when activated, can cause log viewer 300 to display only log entries that contain a particular string. The particular string can be a word, phrase, or sentence in the description field (e.g., "stopped"). The string can also be a particular event ID (e.g., "406").

Log viewer 300 can contain a table view 360, which contains a table with columns and rows for displaying log entries. The columns can contain headers (e.g., "Date," "Module" "Type," "ID," and "Description"). A user click on a header can cause the log entries in table view 360 be sorted on the column under the header. The sorting order can be toggled between high-to-low and low-to-high by a subsequent click on the header. When the number of log entries to display exceeds the number of available rows in table view 360, a user can use a scroll bar 362 to select a window of log entries for viewing. In one example implementation, the rows of the table corresponding to log entry times. A column of the table indicates which software module generated the log entry. Another column of the table indicates a severity condition associated with the software module that generated the entry. A severity condition can be the severity of the event that generated the log entry, i.e. whether the entry is informational, a warning, or an error. A user can select a log entry by clicking on the row of the log entry. A selected log entry can be highlighted.

Figure 3B:
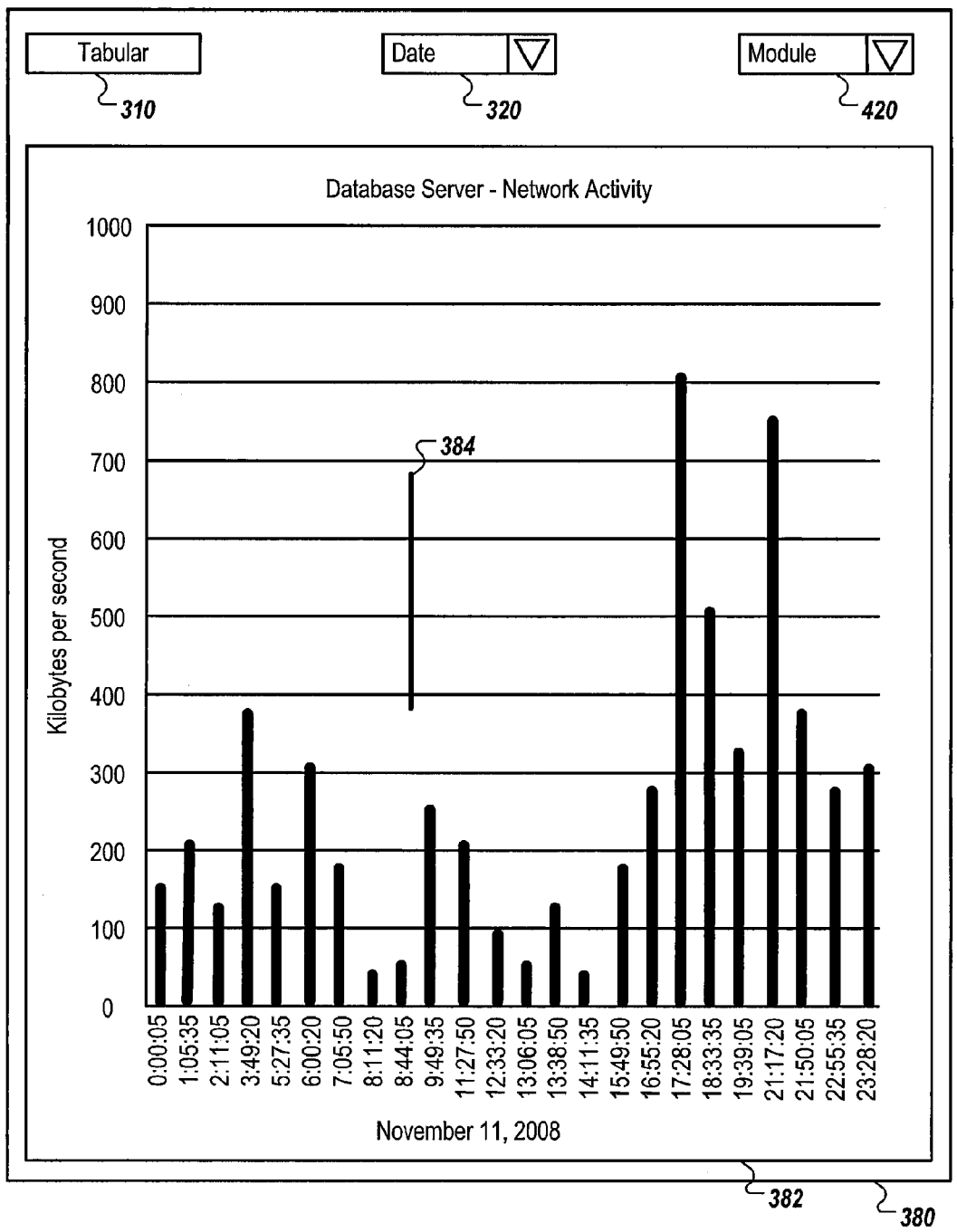

FIG. 3B is an example statistics display 380. In one implementation, the statistics can be generated from a collection of log file entries. For example, Web access statistics can be calculated from counting the number of entries in an access log for a period of time. In another implementation, statistical data represent periodic computer system measurements. The periodic computer system measurements can be runtime measurements of physical resources such as network activity, number of connections and disk activity, etc. Statistical data need not be event based. Therefore, statistical data can be collected at regular intervals by an admin server 240.

A user can enter statistics display 380 by clicking toggle control button 310 on screen 300 in conjunction with module selection control 330. A chart 382 in statistics display 380 shows database server network activity. On an "x" axis a date and time range is displayed. The date range can be controlled by range control box 320. On a "y" axis numbers of kilobytes per second is displayed. A highlighted vertical bar 384 can be displayed in chart 382. Vertical bar 384 can correspond to a highlighted row in a table view 360 in viewer 300. A user can switch chart 382 to display to other software modules or other type statistics on a same software module by using the module selection control 420. A user can toggle back to a table view 360 in log viewer 300 or to a combined tabular-statistics display 400 (see FIG. 4) by clicking toggle control button 310.

Figure 3C:
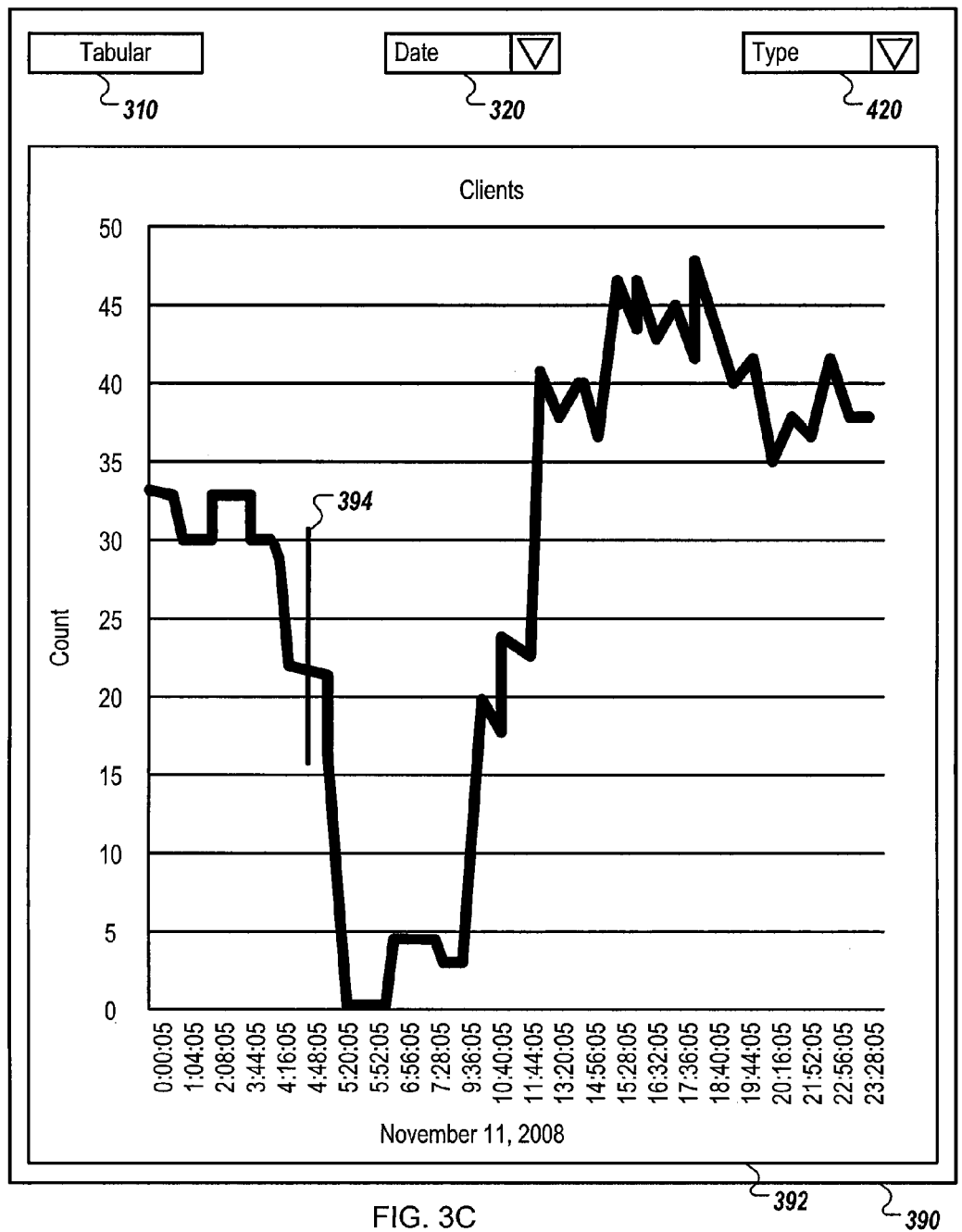

FIG. 3C is another example server statistics display 390. A user can enter server statistics display 390 by clicking toggle control button 310 on screen 300 in conjunction with module selection control 330. A chart 392 in server statistics display 390 shows a number of clients connected to an application server (e.g., Admin Server 240). On the "x" axis a date range is displayed. The date range can be controlled by range control box 320. On the "y" axis the number of clients connected to an application server software module is displayed. A vertical bar 394 can be displayed in highlight. Vertical bar 394 can correspond to a highlighted row in the tabular display 300. A user can switch chart 392 to display to other software modules or other type statistics on a same software module by using the module selection control 420. A user can toggle to back to a tabular display screen 300 or to a combined tabular-statistics display by clicking control button 310.

Example Log Viewer Display with Server Status

Figure 4A:
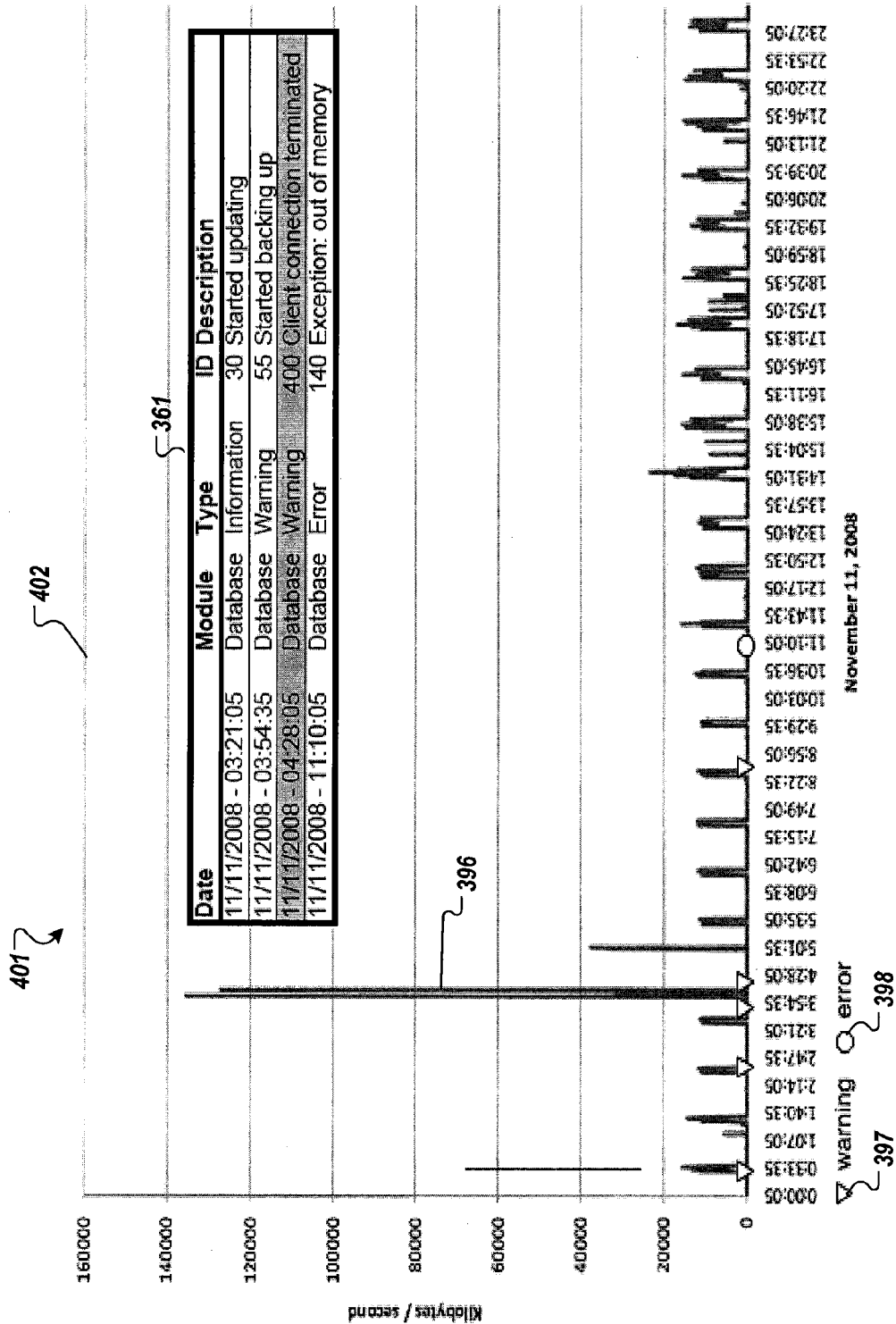
FIGS. 4A and 4B are example displays of a unified log viewer where logs are shown in conjunction with server status.

FIG. 4A is an example display 401 of a unified log viewer where a table of log entries is shown in conjunction with server status. A database status chart 402 is displayed in a background portion of example display 401 of the unified log viewer. A table view 361 is displayed in a foreground portion of example display 401 of the unified log viewer. Controls are not shown in either the database status chart 402 or the table view 361. Controls can be hidden by a server configuration parameter or by a user command. Controls can be desirable when a clean display is required. A clean display can be beneficial for creating clean printed reports or displaying on monitors when user input is not necessary.

A variety of severity levels 397 and 398 are shown in database status chart 402. A triangular symbol 397 can be used to indicate a warning. An octagonal symbol 398 can be used to indicate an error. It should be noted that other shapes, colors, or texts can be used to represent warnings and errors. Warning symbols and error symbols can be displayed on an "x" axis of a database status chart. The position of the symbols of the "x" axis can be determined by the time the warning or the error occurred. By interacting with the warning or error symbols in the database status chart 402, a user can highlight corresponding row or rows in table view 361. Overlaying warning symbols 397 and error symbols 398 in the same graph can aid the navigation of the information displayed. Overlaying table view 361 and chart 401 makes it easier to select an error on the chart 401 and match the error with an entry in table 361. In the example shown, database activity peak 396 occurred between two warnings "started backing up" and "client connection terminated." Such information, provided together in display 401 of a unified log viewer, can help a database administrator in determining whether the database backup operation caused the peak 396 in database server, which in turn caused a user to lose connection.

Figure 4B:
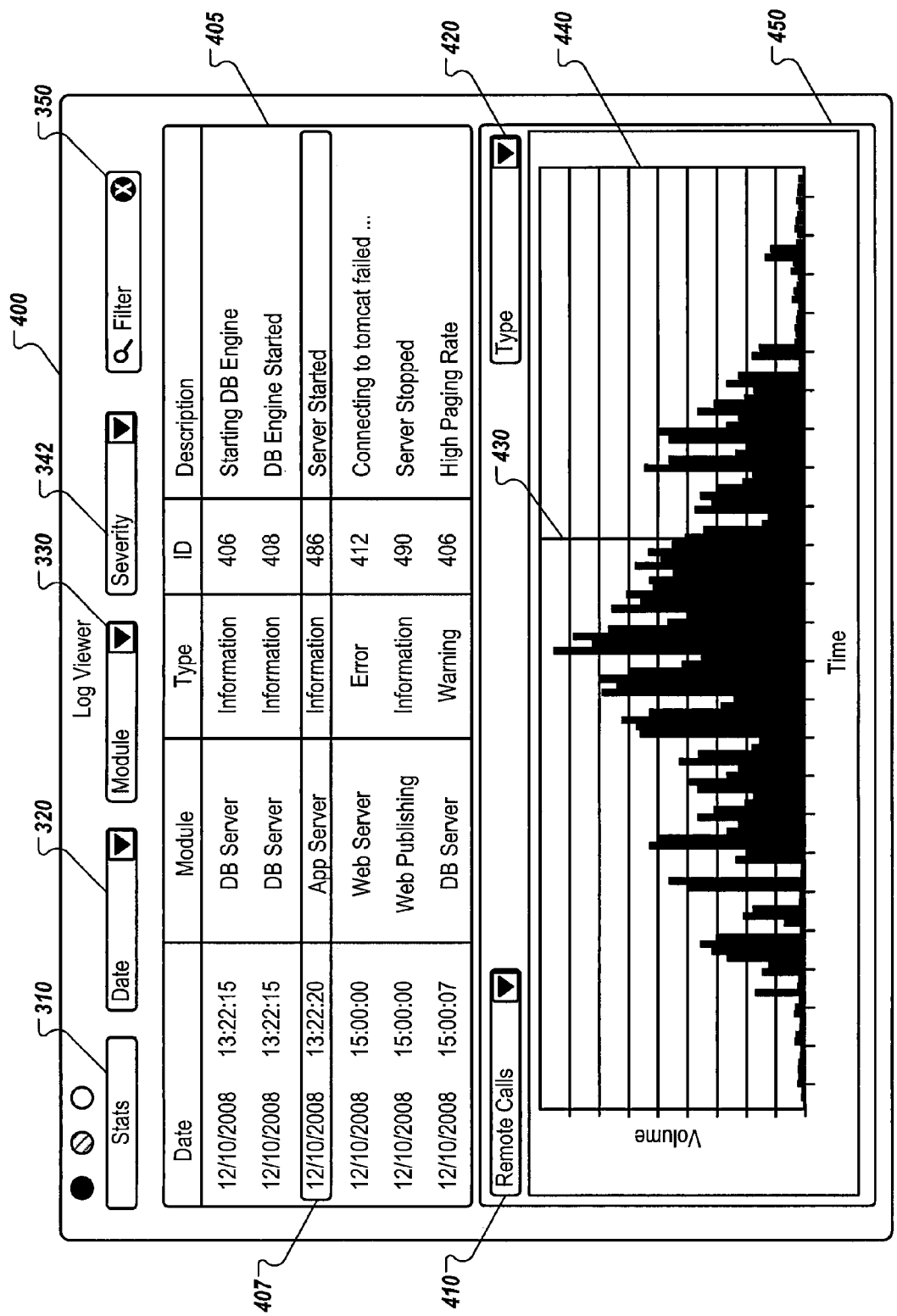

FIG. 4B is another example display of a unified log viewer 400 where a table of log entries is shown in conjunction with server status. An upper portion of unified log viewer 400 can be a tabular display screen 300. The upper portion of display 400 can contain toggle control button 310 for toggling displays, range control box 320 for selecting date or number range, module selection control 330 for selecting software modules for display, severity selection control 342, and column field filter 350 for filtering display fields.

A lower portion 450 of unified log viewer 400 can be a statistics display 380 or 390. The lower portion 450 can contain a module selection control 420, with which a user can change chart 440 to display statistics on other software modules or other statistics of a same software module. In addition, the lower portion can have an additional control 410. Control 410 can assist the display of finer granularity on some types of software module statistics than general statistics. For example, statistics on a software module can be generated to show a number of calls by the software module at a certain time. With control 410, a user can view total number of calls, number of remote calls, and number of system calls to an application server software module. Control 410 can also allow a user to see other information, such as wait time per call, elapsed time per call, number of application clients connected to an application server, disk activity, network activity, memory paging activity, number of database commits, number of distinct users, etc.

The lower portion 450 of unified log viewer 400 can contain a statistical chart 440. The data range and type of statistical chart 440 can be controlled by control units 320, 330, 350, 342 and 420. The date range for statistical chart 440 can correspond to a table view 405 of log entries. A user selection of a row 407 in table view 405 can cause row 407 to be highlighted. The same user selection can cause a log viewer 400 to display a vertical bar 430 that corresponds to the highlighted row. In one example implementation, the correspondence between highlight row 407 and a vertical bar 430 can be time-based. The date and time fields of row 407 can determine the horizontal position on the "x" (time) axis of the vertical bar 430. A user's unselecting highlighted row 407 by selecting another row in table view 405 can cause the other row to be highlighted, and can cause vertical bar 430 to move to another position on the "x" (time) axis corresponding to the other row.

In another example implementation, a user can select a row in tabular display 405 by moving vertical bar 430 in statistical chart 440. A user can click-and-drag the vertical display bar 430 horizontally on the "x" (time) axis. A row in tabular display 405 that has a date and time corresponding to a current position on vertical bar 430 is highlighted. Continued movement of vertical bar 430 can cause the table view 405 to scroll. The movement of vertical bar 430 and the scrolling of table view 405 can be synchronous.

Linking a vertical bar 430 to a highlighted log entry row 407 can enable a user to efficiently identify problems in a heterogeneous system. For example, a user can examine, on the same screen, call volume corresponding to a "server stopped" log entry to determine whether high call volume is a factor in an unexpected server shut down. For another example, a user can choose to view log entries for a first software module in tabular display 405 by making selections with control 330. The user can choose to view statistics for a second software module in statistical chart 440 by making selections with control 420. As a result, the user can view the correlation between different software modules, such as application server activity with corresponding database activity at a particular time.

In the above examples, time is used as a related value between a tabular display 405 and a statistical chart 440. Other factors can be used as alternatives to time. For example, event ID, event number, and event type can all be used as dimension x in place of time. The x and y axes can be configured to represent dimensions that can be retrieved from a plurality of log files.

Example Class Architecture

Figure 5:
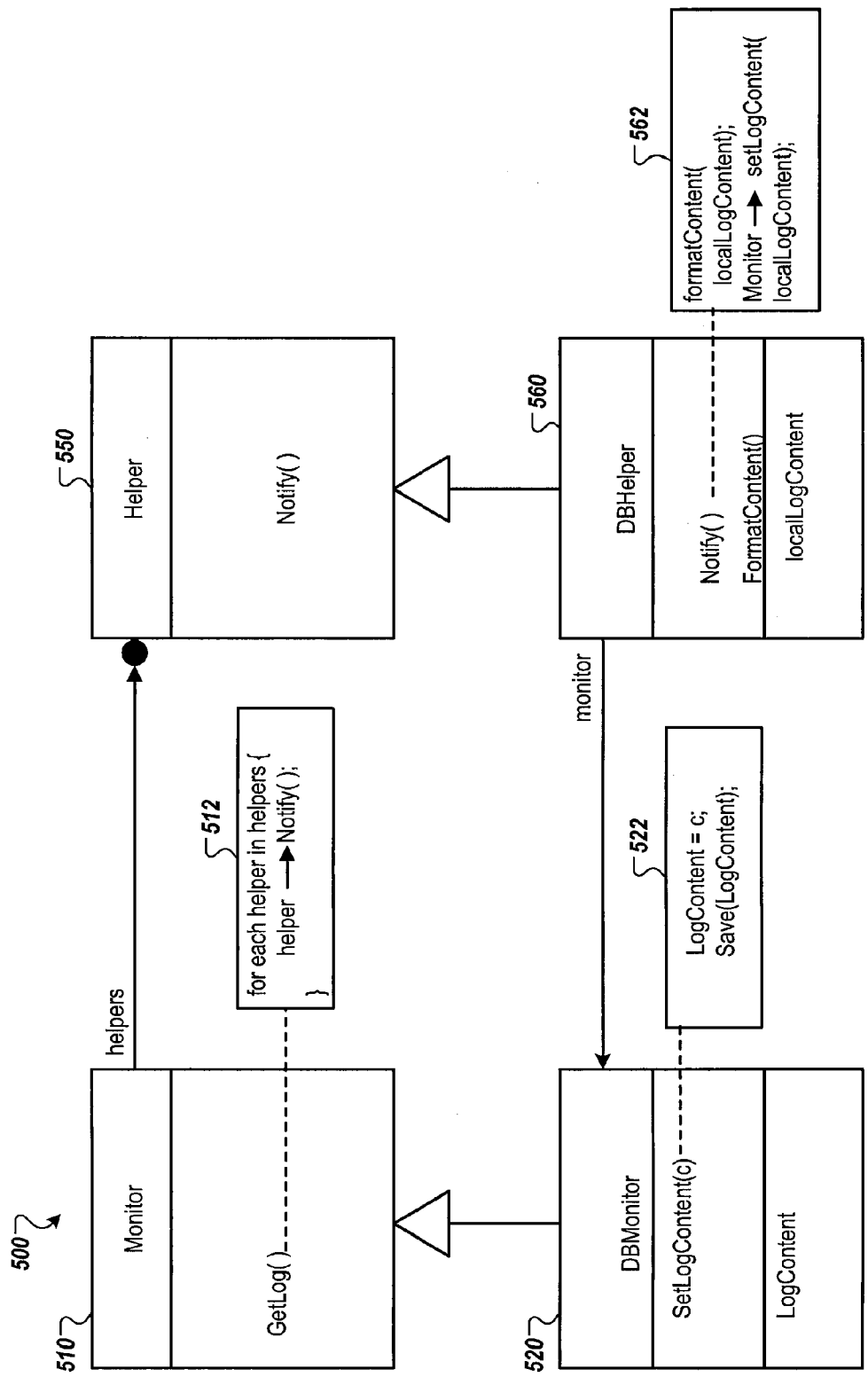
FIG. 5 is a diagram of an example class architecture of an implementation of unified log viewer.

FIG. 5 is a diagram of an example class architecture 500 of an implementation of unified log viewer using object-oriented programming techniques. In example class architecture 500, a "pull" implementation is shown, where an Admin Server 240 polls servers 210, 220, and 230 for updates. A "push" model can also be implemented, where an update of a log file on a software module 210, 220, or 230 triggers an update on an Admin Server 240. A Monitor class 510 can be a base class of admin monitors such as a DBMonitor class 520, WebServerMonitor class, or ApplicationMonitor class. A Monitor 510 class can contain a plurality of instance variables of helpers. In one example implementation, a GetLog( ) method 512 can be invoked periodically or upon user request. GetLog( ) method 512 in the Monitor class 510 can invoke Notify( ) methods for each helper instance. A Notify( ) method in a helper instance will be explained below. In a distributed computing environment, the GetLog ( ) method 512 can also initiate a connection between a client machine where a Helper instance resides and a server machine where a Monitor instance resides. Initiating a connection can be establishing a TCP connection over a socket, establishing an HTTP session, or establishing an SMTP connection.

Helper class 550 can be a base class for specialized helper classes. Helper class 550 can have subclasses that correspond to different types of software modules that are monitored. For example, a DBHelper subclass 560 can be a subclass of Helper 550. Admin helpers 214, 224, and 234 can be instances of Helper class 560 residing on servers 210, 220, and 230.

A DBHelper class 560 can include a monitor object as an instance variable, and a method Notify( ) 562 for notifying the monitor object. A monitor object is an object of a Monitor class 510. A Monitor class 510 can be a component in an admin engine 242. An instance of DBHelper subclass 560 can be part of, or be run concurrent with, a database server software module 230 which is a client to Admin Server 240. DBHelper subclass 560 can inherit public and protected methods of Helper base class 550. For example, DBHelper subclass 560 can inherit the Notify( ) method from Helper base class 550. DBHelper subclass 560 can alternatively overwrite the Notify( ) method 512 with a specific database-related notification process. A DBHelper subclass 520 can also include an instance variable localLogContent. The instance variable localLogContent can be a file handle that points to the actual log file for a database software module. The instance variable localLogContent can alternatively be a string that maps to the last log file entry.

In some example implementations, DBHelper class 560 can contain a private FormatContent( ) method. The FormatContent( ) method can be invoked during notification. A DBMonitor class 520 thus retrieves the value of log file entries that have already been formatted to a unified format. A Notify ( ) method 562 in DBHelper class 560 can invoke the private method FormatContent( ) to format the log files or log file entries in instance variable localLogContent. The Notify ( ) 562 method can invoke a SetLogContent method in a monitor instance to submit log content to a Monitor object.

Base class Monitor 510 can have subclasses that correspond to different plug-ins on a server. For example, a DBMonitor subclass 520 can be a subclass of Monitor 510. An instance of DBMonitor class can reside on an Admin Server 240. DBMonitor subclass 520 can inherit public and protected methods of Monitor base class 510. DBMonitor subclass 520 can have a SetLogContent( ) method 522, which saves log content to an instance variable LogContent. An instance of DBMonitor class 520 can reside on a computer different from a computer where an instance of DBHelper class 560 resides. In such cases, connection between the two computers can be initialized before Notify( ) method 562 can invoke SetLogContent( ) method 522. If the SetLogContent( ) method 522 has been invoked by the Notify( ) method 562 in an instance of a Helper 550 which was in turn invoked by GetLog( ) method 512, proper connections between will have been properly established already by the Notify( ) method 512. To guarantee that only Notify( ) method 512 can invoke Update( ) method 562, and that only Update( ) method 562 can invoke SetLogContent method 522, both SetLogContent method 522 and Update( ) method 562 can be made protected methods and Monitor class 510 can be made into a friend class of Helper class 550.

In some example implementations, DBMonitor class 520 can contain a caching method, which stores retrieved log files a cache in the log files' original format on an Admin Server 240. The retrieved log files can be formatted at view time. In some other example implementations, the retrieved log files can be saved in a database, or in a serialized object structure.

Example System

Figure 6:
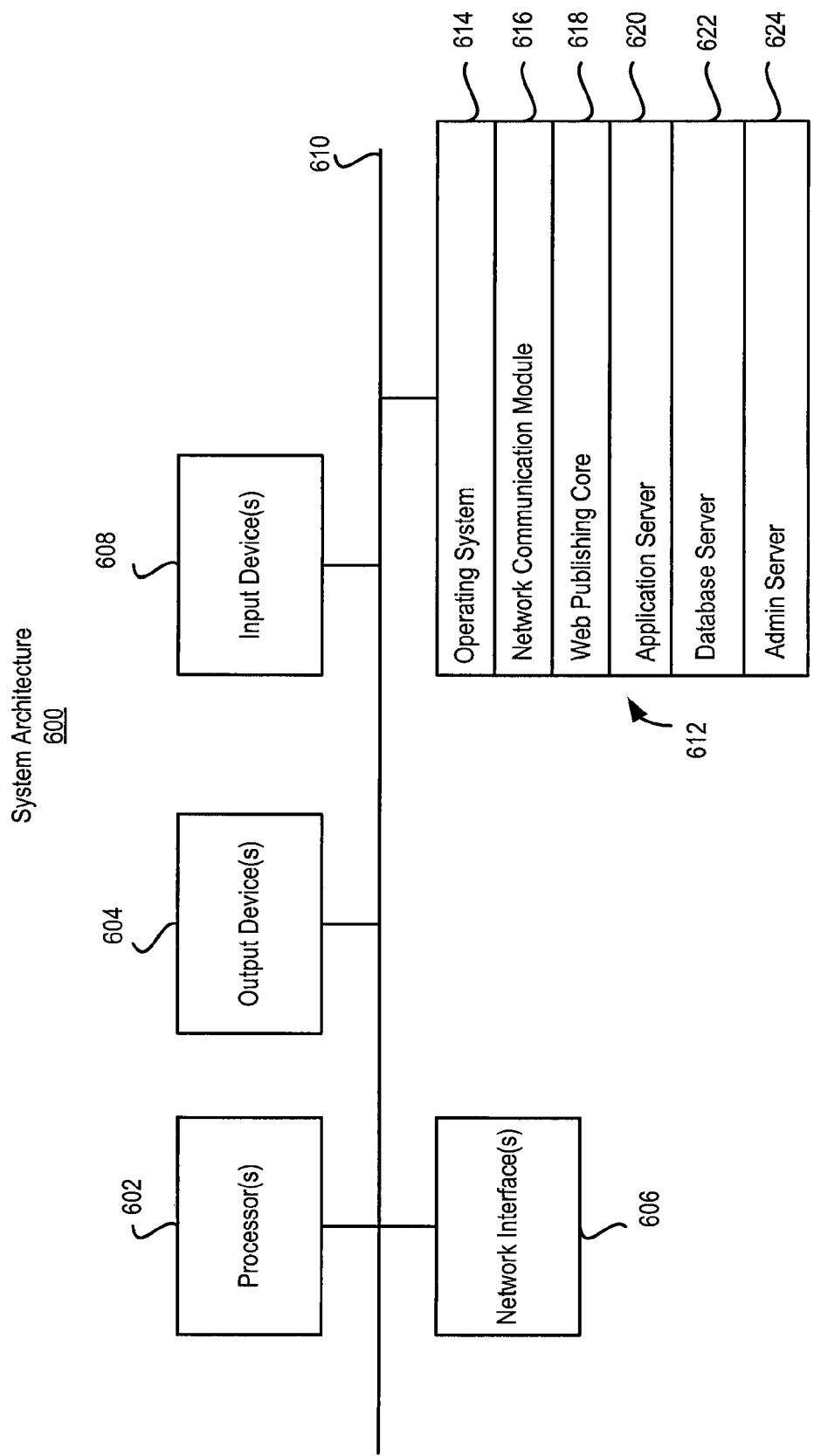
FIG. 6 is a block diagram of an example system architecture for implementing the features and operations described in reference to FIGS. 1-5.

FIG. 6 is a block diagram of a system architecture 600 for implementing the features and operations described in reference to FIGS. 1-5. Other architectures are possible, including architectures with more or fewer components. In some implementations, the architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics.

The computer-readable medium 612 further includes an operating system 614 (e.g., Mac OS® server, Windows® NT server), a network communication module 616, Web Publishing Core 618 (e.g., Apache HTTP Server with customized DSO module), an Application Server 620 (e.g., FileMaker Pro™), Database Server 622 (e.g., MySQL™), and Admin Server 624. The operating system 614 can be multi-user, multiprocessing, multitasking, multithreading, real time, etc. The operating system 614 performs basic tasks, including but not limited to: recognizing input from and providing output to the devices 606, 608; keeping track and managing files and directories on computer-readable mediums 612 (e.g., memory or a storage device); controlling peripheral devices; and managing traffic on the one or more communication channels 610. The network communications module 616 includes various components for establishing and maintaining network connections (e.g., software for implementing communication protocols, such as TCP/IP, HTTP, etc.).

The architecture 600 is one example of a suitable architecture for hosting a browser application having audio controls. Other architectures are possible, which include more or fewer components. The architecture 600 can be included in any device capable of hosting a database management system. The architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

For example, in FIG. 1, receiving a first log file in step 102 precedes receiving a second log file in step 104. It should be noted that the order of receiving log files can be arbitrary. Receiving a first log file in step 102 can occur concurrently with, or after, receiving a second log file in step 104. Furthermore, the terms "first log file" and "second log file" are used for illustrative purposes. An arbitrary number of log files in an arbitrary number of log file formats can be supported by the method, computer program product, and system.

For another example, in FIG. 3A, data columns are arranged in the order of Date, Module, Type, ID, and Description. It should be noted that the data columns can be arranged in any order. Further, a table view can contain more or fewer columns than what are shown in the examples.

What is claimed is:

1. A computer-implemented method of viewing logs in a database management system, comprising:
   obtaining a first log file in a first format, the first log file associated with a first software module of the database management system;
   obtaining a second log file in a second format, wherein the second format is associated with a second software module of the database management system, and wherein the second format differs from the first format;
   converting log entries in the first log file and log entries in the second log file into a third format, wherein the third format differs from the first format and the second format; and
   responsive to a log viewing request, presenting the converted log entries in a log viewer in the third format on a display device, wherein the log entries are presented in a table comprising rows and columns, the rows of the table corresponding to log entry times, a first column of the table indicating the first software module or the second software module, and a second column of the table indicating a severity condition associated with the first software module or the second software module.

2. The method of claim 1, wherein presenting the converted log entries in the log viewer comprises displaying statistics of software modules, the statistics generated by periodic computer system measurements.

3. The method of claim 1, wherein presenting the converted log entries in the log viewer comprises:
   displaying the log entries in a table view in a first portion of the log viewer;
   displaying statistics of software modules in a second portion of the log viewer, the statistics generated by periodic computer system measurements; and
   displaying graphical controls that link the log entries with the statistics, wherein a user's selection in one portion of the log viewer causes updates in another portion of the log viewer.

4. The method of claim 3, where the graphical controls allow toggling between the table view, a statistics display, and a combined table view and statistics display.

5. The method of claim 3, wherein the updates in the portions of the log viewer is synchronous.

6. The method of claim 1, wherein the first and second software modules are heterogeneous.

7. A computer-readable medium storing a computer program which, when executed by a computer processor, causes the computer processor to perform operations comprising:
   obtaining a first log file in a first format, the first log file associated with a first software module of a database management system;
   obtaining a second log file in a second format, wherein the second format is associated with a second software module of the database management system, and wherein the second format differs from the first format;
   converting log entries in the first log file and log entries in the second log file into a third format, wherein the third format differs from the first format and the second format; and
   responsive to a log viewing request, presenting the converted log entries in a log viewer in the third format on a display device, wherein the log entries are presented in a table comprising rows and columns, the rows of the table corresponding to log entry times, a first column of the table indicating the first software module or the second software module, and a second column of the table indicating a severity condition associated with the first software module or the second software module.

8. The computer-readable medium of claim 7, wherein presenting the converted log entries in the log viewer comprises displaying statistics of software modules, the statistics generated by periodic computer system measurements.

9. The computer-readable medium of claim 7, wherein presenting the converted log entries in the log viewer comprises:
   displaying the log entries in a table view in a first portion of the log viewer;

displaying statistics of software modules in a second portion of the log viewer, the statistics generated by periodic computer system measurements; and displaying graphical controls that link the log entries with the statistics, wherein a user's selection in one portion of the log viewer causes updates in another portion of the log viewer.

10. The computer-readable medium of claim 9, where the graphical controls allow toggling between the table view, a statistics display, and a combined table view and statistics display.

11. The computer-readable medium of claim 9, wherein the updates in the portions of the log viewer are synchronous.

12. The computer-readable medium of claim 7, wherein the first and second software modules are heterogeneous.

13. A system comprising:

a processor;

memory coupled to the processor and operable for storing instructions, which, when executed by the processor, cause the processor to perform operations comprising:

obtaining a first log file in a first format, the first log file associated with a first software module of a database management system;

obtaining a second log file in a second format, wherein the second format is associated with a second software module of the database management system, and wherein the second format differs from the first format;

converting log entries in the first log file and log entries in the second log file into a third format, wherein the third format differs from the first format and the second format; and responsive to a log viewing request, presenting the converted log entries in a log viewer in the third format on a display device, wherein the log entries are presented in a table comprising rows and columns, the rows of the table corresponding to log entry times, a first column of the table indicating the first software module or the second software module, and a second column of the table indicating a severity condition associated with the first software module or the second software module.

14. The system of claim 13 wherein presenting the converted log files in the log viewer comprises displaying statistics of software modules, the statistics generated by periodic computer system measurements.

15. The system of claim 13, wherein presenting the converted log files in the log viewer comprises:

displaying log entries in a table view in a first portion of the log viewer;

displaying statistics of software modules in a second portion of the log viewer, the statistics generated by periodic computer system measurements; and displaying graphical controls that link the log entries with the statistics, wherein a user's selection in one portion of the log viewer causes updates in another portion of the log viewer.

16. The system of claim 15, where the graphical controls allow toggling between the table view, a statistics display, and a combined table view and statistics display.

17. The system of claim 15, wherein the updates in the portions of the log viewer are synchronous.

18. The system of claim 13, wherein the first and second software modules are heterogeneous.

* * * * *